(12) United States Patent
Adamovics

(10) Patent No.: US 7,098,463 B2
(45) Date of Patent: Aug. 29, 2006

(54) THREE-DIMENSIONAL DOSIMETER FOR PENETRATING RADIATION AND METHOD OF USE

(75) Inventor: John A. Adamovics, Skillman, NJ (US)

(73) Assignee: Heuris Pharma, LLC, Skillman, NJ (US)

(*) Notice: Subject to any disclaimer, the term of this patent is extended or adjusted under 35 U.S.C. 154(b) by 0 days.

(21) Appl. No.: 10/790,280

(22) Filed: Mar. 1, 2004

(65) Prior Publication Data

US 2004/0211917 A1    Oct. 28, 2004

Related U.S. Application Data

(60) Provisional application No. 60/451,826, filed on Mar. 3, 2003.

(51) Int. Cl.
*G01N 5/00* (2006.01)
(52) U.S. Cl. .................................. 250/474.1
(58) Field of Classification Search ............ 250/472.1, 250/474.1, 482.1, 484.5
See application file for complete search history.

(56) References Cited

U.S. PATENT DOCUMENTS

| | | | | |
|---|---|---|---|---|
| 2,936,276 | A | 5/1960 | Chalkley | 205/158 |
| 3,370,981 | A | 2/1968 | Ney et al. | 117/230 |
| 3,609,093 | A | 9/1971 | Harrah | 252/300 |
| 3,710,109 | A | 1/1973 | Chalkley | 250/83 |
| 3,743,846 | A | 7/1973 | Matsumoto et al. | 250/474 |
| 3,903,423 | A | 9/1975 | Zweig | 250/474 |
| 4,143,274 | A | 3/1979 | Apfel | 250/473.1 |
| 4,288,861 | A | 9/1981 | Swainson et al. | 250/473.1 |
| 4,350,607 | A | 9/1982 | Apfel | 252/408.1 |
| 4,394,737 | A | 7/1983 | Komaki et al. | 378/23 |
| 4,575,330 | A | 3/1986 | Hull et al. | 425/174.4 |
| 4,779,000 | A | 10/1988 | Ing | 250/390.03 |
| 4,829,187 | A | 5/1989 | Tomita et al. | 250/474.1 |
| 4,929,402 | A | 5/1990 | Hull | 264/401 |
| 4,996,010 | A | 2/1991 | Modrek | 264/401 |
| 4,999,143 | A | 3/1991 | Hull et al. | 264/401 |

(Continued)

FOREIGN PATENT DOCUMENTS

GB    2 182 941 A    5/1987

OTHER PUBLICATIONS

Kantz et al., "Quality Assurance for Radiation Processing", Radiat. Phys. Chem., vol. 14, pp. 575-584, Pergamon Press Ltd. 1979.

(Continued)

*Primary Examiner*—David Porta
*Assistant Examiner*—Marcus Taningco
(74) *Attorney, Agent, or Firm*—Mathews, Shepherd, McKay & Bruneau, P.A.

(57) ABSTRACT

This invention relates to a method of forming a three-dimensional (3D) dosimetric map in a solid translucent or transparent polymer and to an article of manufacture comprising a polymer formulated to capture data imparted by incident penetrating radiation. The present invention provides a method of preparation of a solid translucent or transparent polymer matrix capable of detecting and displaying a dose or doses of penetrating radiation by forming within the polymeric matrix a 3D dosimetric map which is measurable and quantifiable by various known procedures. The dosimetric map is representative of the 3D distribution of the dose or doses of the penetrating radiation to which the polymer had been exposed and can be quantified at high spatial resolution, thereby providing an accurate, stable, storable record in three dimensions of the radiation exposure or dosing event(s).

8 Claims, 2 Drawing Sheets

U.S. PATENT DOCUMENTS

| | | | |
|---|---|---|---|
| 5,015,424 A | 5/1991 | Smalley | 264/401 |
| 5,058,988 A | 10/1991 | Spence | 356/121 |
| 5,059,021 A | 10/1991 | Spence et al. | 356/121 |
| 5,059,359 A | 10/1991 | Hull et al. | 264/401 |
| 5,076,974 A | 12/1991 | Modrek et al. | 264/401 |
| 5,096,530 A | 3/1992 | Cohen | 156/226 |
| 5,104,592 A | 4/1992 | Hull et al. | 264/401 |
| 5,117,116 A | 5/1992 | Bannard et al. | 250/474.1 |
| 5,123,734 A | 6/1992 | Spence et al. | 356/121 |
| 5,130,365 A | 7/1992 | Koishi et al. | 524/520 |
| 5,206,118 A * | 4/1993 | Sidney et al. | 430/343 |
| 5,319,210 A | 6/1994 | Moscovitch | 250/474.1 |
| 5,321,357 A | 6/1994 | Maryanski et al. | 324/300 |
| 5,430,308 A | 7/1995 | Feichtner et al. | 250/580 |
| 5,498,876 A | 3/1996 | Moscovitch | 250/474.1 |
| 5,633,584 A | 5/1997 | Maryanskl et al. | 324/300 |
| 5,661,310 A | 8/1997 | Jones | 250/584 |
| 6,132,681 A * | 10/2000 | Faran et al. | 422/58 |
| 6,218,673 B1 | 4/2001 | Gore et al. | 250/474.1 |
| 6,485,886 B1 * | 11/2002 | Yamato et al. | 430/270.1 |
| 6,621,086 B1 | 9/2003 | Appleby | 250/492.1 |

OTHER PUBLICATIONS

McLaughlin et al., "The Gamma-Ray Response of Radiochromic Dye Films at Different Absorbed Dose Rates", Radiat. Phys. Chem., vol. 18, No. 5-6, pp. 987-999, 1981.

Ueno, K., "Development of a Plastic Dosimeter for Industrial Use With High Doses", Appl. Radiat. Isot. vol.31, Nos. 4-6, pp. 467-472, 1988, Int. J. Radiat. Appl. Instrum. Part C.

Olsson et al., "A New Dosimeter Based on Ferrous Sulphate Solution and Agarose Gel", Appl. Radiat. Isot. vol. 42, No. 11, pp. 1081-1086, 1991, Int. J. Radiat. Appl. Instrum. Part A.

Muthyala, R., "Chemistry and Applications of Leuco Dyes", Topics in Applied Chemistry, Plenum Press, New York, 1997, no page numbers.

Hart, E et al., Chemical Dosimetry, Chapter 12, pp. 167-239, Radiation Dosimetry, Academic Press, 1966.

Kosar, J., Light-Sensitive Systems: Chemistry and Application of Nonsilver Halide Photographic Processes, "Photochemical Formation and Destruction of Dyes" pp. 366-381 & p. 408.

Holm, N. and Berry, R., Manual on Radiation Dosimetry, Chapter IV "Films, Dyes, and Photographic Systems", pp. 129-177, 1070.

Parthenopoulos, D. and Rentzepis, P., "Three-Dimensional Optical Storage Memory" pp. 843-845, Aug. 25, 1989, Department of Chemistry, University of California Irvine, Irvine CA.

Becker, Klaus, "Solid State Dosimetry" Chapter 6, pp. 230-237, CRC Press, 1976.

McKinlay, A.F., "Thermoluminescence Dosimetry" Chapter 4, "Applications of Thermoluminescence Dosimetry in Medicine", pp. 59-88, 1981.

Farahani, M. et al., "Radiochromic Solutions for Reference Dosimetry", Appl. Radiat. Isot. vol. 41, No. 1, pp. 5-11, 1990, INt. J. Radiat. Appl. Instrum. Part A.

Diffey, B.L. et al., "A dosimeter for long wave ultraviolet radiation", British Journal of Dermatology (1977) 97, pp. 127-130.

McJury, M et al., "Radiation dosimetry using polymer gels: methods and applications", The British Journal of Radiology73 (2000), pp. 919-929.

Zweig, J et al., "Drug Activation by Gamma Irradiation: A New Direction for Molecular Design. Part I: In Vitro and In Vivo Studies of a Substituted Polyamino-aryl Nitrile", Cancer Treatment Reports, vol. 61, No. 3, May/Jun. 1977.

Hoecker, F.E. and Watkins, I.W., "Radiation Polymerization Dosimetry", International Journal of Applied Radiation and Isotopes, 1958, vol. 3, pp. 31-35, Pergamon Press Ltd., London.

McLaughlin, W.L. "The Gamma-Ray Response of Pararosaniline Cyanide Dosimeter Solutions", International Journal of Applied Radiation and Isotopes, 1974, vol. 25, pp. 249-262.

Kosanic, M et al., "Liquid Radiochromic Dye Dosimetry for Continuous and Pulsed Radiation Fields Over a Wide Range of Energy Flux Densities", International Journal of Applied Radiation and Isotopes, 1977, vol. 28, pp. 313-321.

Miyaji, T et al., "Development of a Radiation Dosimeter Consisting of Leuco Crystal Violet and a Small Amount of Halocarbons", Journal of Photopolymer Science and Technology, vol. 14, No. 20(2001), pp. 225-226.

Tokita, S. et al., "Application of Photo Acid Generators for y Rays Detective Materials", Journal of Photopolymer Science and Technology, vol. 14, No. 2 (2001), pp. 221-224.

MacLachlan, A., "The Carbon Tetrachloride Sensitized Photooxidation of Leuco Ethyl Crystal Violet", The Journal of Phsical Chemistry, pp. 718-722, 1966.

Bobrowski, K et al., "A Pulse Radiolysis Study of the Leucocyanide of Malachite Green Dye in Organic Solvents", J. Phys. Chem. 1985, 89, pp. 4358-4366.

Appleby, A and Leghrouz, A., "Imaging of radiation dose by visible color development in ferrous-agarose-xylenol orange gels", Med. Phys. 18(2), Mar./Apr. pp. 309-312, 1991.

Niroomand, A et al., "Radiochromic film dosimetry: Recommendations of AAPM Radiation Therapy Committee Task Group 55", Med. Phys. 25 (11), Nov. 1998, pp. 2093-2115.

Day, M et al., "Chemical Effects of Ionizing Radiation in Some Gels", Nature, Jul. 22, 1950,vol. 166, pp. 146-147.

Rahn, R et al., "Technical Note Iodouracil as a Personal Dosimeter for Solar UVB", Photochemistry and Photobiology, 1998, 68(2), pp. 173-178.

Diffey, B.L., "Observed and Predicted Minimal Erythema Doses: A Comparative Study", Photochemistry and Photobiology, vol. 60, No. 4, pp. 380-382, 1994.

Gore, J. C et al., "Measurement of Radiation Dose Distributions by Nuclear Magnetic Resonance (NMR) Imaging", Phys. Med. Biol., 1984, vol. 29, No. 10, 1189-1197.

Schulz, R. J et al., "Dose-Response Curves for Fricke-Infused Agarose Gels as Obtained by Nuclear Magnetic Resonance", Phys. Med. Biol., 1990, vol. 35, No. 12, pp. 1611-1622.

Day, M., "Radiation Dosimetry Using Nuclear Magnetic Resonance: An Introductory Review", Phys. Med. Biol, 1990, vol. 35, No. 12, pp. 1605-1609.

Parisi, A. V et al., "Assessment of the Exposure to Biologically Effective UV Radiation Using a Dosimetric Technique to Evaluate the Solar Spectrum", Phys. Med. Biol. 42, (1990) pp. 77-88.

MacDougall, N. D et al., "A Systematic Review of the Precision and Accuracy of Dose Measurements in Photon Radiotherapy Using Polymer and Fricke MRI Gel Dosimetry", Phys. Med. Biol. 47 (2002), pp. R107-R121.

Chu, K. C et al., "Polyvinyl Alcohol-Fricke Hydrogel and Cryogel: Two New Gel Dosimetry Systems with Low Fe3+ Diffusion", Phys. Med. Biol. 45 (2000) pp. 955-969.

Sidney, L. N et al., "A New Radiochromic Dosimeter Film", Radiat. Phys. Chem. vol. 35, Nos. 4-6, pp. 779-782, 1990.

Khan, H et al., "A Radiochromic Film Dosimeter For Gamma Radiation in the Absorbed-Dose Range 0.1-10 kGy", Radiat. Phys. Chem vol. 38, No. 4, pp. 395-398, 1991.

Petkov, I et al., "New Two-Functional UVR Sunscreen Protector and Dosimeter", www.photobiology.com/photobiology2000/petkov/index.htm, May 11, 2004.

* cited by examiner

THREE-DIMENSIONAL DOSIMETER FOR PENETRATING RADIATION AND METHOD OF USE

CROSS-REFERENCED TO RELATED APPLICATION

This application claims the benefit of U.S. Provisional Patent Application No. 60/451,826 filed Mar. 3, 2003, the entirety of which is hereby incorporated by reference into this application.

GOVERNMENT INTEREST

This invention was made with government support under R43 CA88595-01A2 awarded by the Department of Health and Human Services and the United States Government has certain rights in the invention.

BACKGROUND OF THE INVENTION

Dosimeters were developed in order to provide a means of reliably and reproducibly measuring the extent, degree, and distribution of penetration of radiation into media of interest. "Dosimeter" is defined herein as a device designed to undergo changes upon exposure to penetrating radiation, the changes being detectable and quantifiable by the practitioner, and the changes being indicative of the amount and distribution of the incident radiation contained in that exposure. "Penetrating radiation" is defined herein as electromagnetic energy having the form of particles or waves which permeates to some extent a medium of interest in the application. Energy deflected, reflected, or otherwise repelled from the surface of the medium is not penetrating; whereas energy absorbed, transmitted, or in any other sense passing into or through the medium is defined as penetrating. Penetrating radiation may be of natural origin (including, but not limited to sunlight, alpha particles, beta particles, gamma radiation, and other examples of the electromagnetic spectrum) or may be manmade (including, but not limited to neutron radiation, proton radiation, photon radiation, e-beam radiation, high-intensity x-radiation, carbon ion beam radiation, UVA light (400 nm–320 nm), UVB light (320 nm–290 nm), UVC light (290 nm–100 nm), and laser light). It has long been of importance to monitor the extent, degree and distribution of the penetration of this sort of radiation into various media in order to measure and assess the effects of exposure upon materials and humans.

Dosimeters have been known for over five decades. (See Day, M. et al., Nature 1950; 166:146–147 Day, M., Phys Med Biol. 1990; 35:1605–1609; Hoecker, F. and Watkins, I., Int J Appl Rad Iso. 1958; 3:31–35; The radiochromic effect and its chemical mechanisms have been studied as a means of radiation dosimetry (see McLaughlin, W. L., Trans. Am. Nucl. Soc. 1968; 11:460; McLaughlin, W. L. and Kosanic, M., Int. J. Appl. Radiat. Isot. 1974; 25:249; McLaughlin, W. L. et al., Riso Report M-2202, Riso National Lab., Roskilde, Denmark, 1979; Kosanic, M. M. et al., Int. J. Appl. Radiat. Isot. 1977; 28:313; Bobrowski, K. et al., J. Phys. Chem. 1985; 89:4358.). Previously it was shown that radiation can be monitored by exposure of two-dimensional films, plates, or flat composites made from, inter alia, photographic emulsions (silver halide on cellulose and advancements on this art: Becker, K., Solid State Dosimetry, CRC Press, Cleveland, Ohio, 1973, pp. 231–237), thermoluminescent materials (lithium fluoride formulations and advancements on this art, McKinlay, Thermoluminescence Dosimetry, Chapter 4, Adam Hilger Ltd., 1981), phosphate glass, phosphor-containing materials, gels or films containing radiochromic dyes (McLaughlin, W. et al., Radiat. Phys. Chem 198; 18:987–989). Sunlight dosimeters have been described, see Petkov, I. and Nunzi, J. in Third Internet Photochemistry and Photobiology Conference, Nov. 24–Dec. 24 2000; Diffey, B. Photochem. Photobiol. 1994; 60:380–382; Parisi, A. et al., Phys. Med. Biol., 1997; 42:77–88; Diffey, B. et al., Br. J. Dermatol., 1997; 97:127–130; Rahn, R. and Lee, M., Photochem. Photobiol. 1998, 68:173–178.

Examples of "reporter compounds" of the invention. Leuco dyes are defined herein as compounds which undergo a structural change: 1) upon the absorption of penetrating radiation, or 2) by the action of a local decrease in pH brought about by the liberation of H+ ions caused by the absorption, by the medium or by an added activator molecule, of penetrating radiation, or 3) or by the action of radical species generated by the absorption of radiation by the medium or by an added activator molecule. The structural change gives rise to a corresponding change in one or more optical properties of the leuco dye. The change or changes in optical properties can be, but is not limited to, a shift in the absorption spectrum in the IR or the UV-visible range, for example such that the "leuco" or starting structure is colorless and the radiation-transformed structure is colored; or the induction of fluorescence or phosphorescence. Examples of leuco dyes are photochromic dyes, radiochromic dyes, pH-indicating dyes, and radiographic dyes. Leuco dye systems are well known in the literature. Leuco dyes in their reduced leuco form, when properly chosen, can form the basis of color image forming systems. Radiographic imaging based on crosslinking of organic molecules by absorbed radiation has been described (Kosar, J., Light-Sensitive Systems, Wiley, N.Y., 1965; pp. 158–193, MacLaughlin, W. L., in Manual on Radiation Dosimetry, Holm, N. and Berry, R., eds., Dekker, N.Y., 1970, pp. 129–177). Use of tetrazolium dyes in radiographic imaging in colloids and aqueous gels has been reported Zweig, J. I. et al., Cancer Treatment Rep. 1977; 61:419–423). Leuco dye systems are further discussed in Kosar's Light Sensitive Systems, pp. 367, 370–380, 406, (1965), Wiley and Son, Inc., N.Y.; and Chemistry and Applications of Leuco Dyes R. Muthyala, ed., (1997), pp. 1–3, 47–53, 67–74, 97–98, 125–127, 159–162, 207–208, Plenum Press, N.Y. Leuco dyes in solution have been used for dosimetry (Farahani, M. et al., Appl. Radiat. Isot. (Int. J. Radiat. Appl. Instrum. Part A) 1990; 41:5–11. Leuco dyes have been incorporated in polymer films and evaluated as two-dimensional dosimeters: Sidney, L. N. et al., Radiat. Phys. Chem. (Int. J. Radiat. Appl. Instrum., Part C) 1990; 35:779–782; Khan, H. M. et al., Radiat. Phys. Chem. (Int. J. Radiat. Appl. Instrum., Part C) 1991; 38:395–398; and U.S. Pat. Nos. 2,936,276; 3,370,981; 3,609,093; 3,710,109; 3,743,846; 3,903,423; 4,829,187; and 5,117,116. Films containing dyes or dye precursors have been employed as routine dosimeters for food irradiation, sterilization of medical products, and radiation processing (MacLaughlin, W. L. in Sterilization by Ionizing Radiation, Gaughran, R. and Goudie, A., eds., Multiscience, Montreal, Vol. I, 1974; Humphries, K. and Kantz, A. Radiat. Phys. Chem. 1977; 9: 737; Kantz, A. and Humphries, K., Radiat. Phys. Chem. 1979; 14: 575). Leuco dyes in organic solvents have been irradiated using halocarbons as activators. See MacLachlan, A., J. Phys. Chem. 1967; 71:718–722; Miyaji, T., et al., J. Photopolym. Sci. Technol. 2001; 14:225–226; UK Patent Application GB 2182941A). pH-Indicating dyes have been admixed with polyvinyl chloride to produce polymers which give a color reaction upon irradiation due to HCl liberated by a radiolytic process (U.S. Pat. Nos. 3,743,846 and 3,899,677; Ueno, K., Radiat. Phys. Chem. 1988; 31:467–472). Leuco dyes formulated with photo acid generators in solvent systems have also been described. See Tokita, S., et al., J. Photopolym. Sci. Technol. 2001; 14:221–224.

Another form of radiochromic dye based on polydiacetylenes has been described. In this system, a colorless dispersion of monomeric species is polymerized upon exposure to radiation, resulting in the development of colored regions, or regions having otherwise altered optical properties. Film formulations utilizing this technology have been commercialized (GafChromic™ Films, International Specialty Products, Wayne, N.J.). A review of dosimeters formed by these films has appeared (Niroomand, A. et al., Med. Phys. 1998; 25:2093–2115).

It was found that by stacking, laminating, layering, or organizing dosimeter films into a three-dimensional shape, a heterogeneous system could be fabricated which approximates a 3D dosimeter. U.S. Pat. Nos. 5,661,310; 5,430,308; 5,130,065; 5,123,734; 5,104,592; 5,096,530; 5,076,974; 5,059,359; 5,059,021; 5,058,988; 5,015,424; 4,999,143; 4,996,010; 4,929,402; 4,394,737 and 4,575,330 disclose variants of this technology. Some of the disadvantages of utilizing multiple thin films or plates to measure penetrating radiation in a three-dimensional volume are: difficulty in designing, manufacturing, assembling, positioning and securing several discrete films or plates; limitations in size and shape of the fabricated dosimeter due to its inherent composite nature; difficulty and time-consumption of disassembly of the fabrication, identification of the original location of each film or plate, and scanning data from each distinct film or plate; inherent error in measurement due to the unavoidable heterogeneity of the dosimeter due to its composite nature.

Another approach to the fabrication of a 3D dosimeter uses the employment of aqueous gels containing materials to interact with incident penetrating radiation to give species which could later be detected and quantified. Dosimeters containing ferrous salts ("Fricke solution") have been utilized in mapping penetrating radiation (Fricke, H. and Hart, E. "Chemical Dosimetry" in Radiation Dosimetry Vol. II, Chapter 12, Attix, F. et al. ed., Academic Press, New York, 1966). Aqueous gels containing Fricke dosimeter solution in combination with magnetic resonance imaging (MRI) techniques have been disclosed (Gore, J. C., et al., Phys. Med. Biol. 1984; 29:1189–1197;). In this approach, the radiation-induced oxidation of ferrous to ferric ions in solution could be detected by a change in the water proton spin relaxation times, T1 and T2, and the changes were large enough to be mapped with high spatial resolution by MRI when the Fricke solution was dispersed in a gelatin or agarose gel. (Gore, J. C., et al., Mag. Res. Imaging, 1984; 2:244; Schulz, R. J., et al., Phys. Med. Biol. 1990; 35:1611–1622). A similar dosimeter based on ferrous sulfate and agarose gel was described. (See Olesson et al., Appl. Radiat. Isot. 1991; 42:1081–1086; Appleby, A. and Leghrouz, A., Med. Phys. 1991; 18:309–312.) Some disadvantages associated with the use of this approach are the rapid diffusion of oxidized ions resulting in an inherent limitation to stability and resolution of the image, the necessity for relatively high dose rates and long radiation times, and unpredictable behavior in small volumes.

New Fricke systems with improved diffusion parameters have been developed. (See Chu, K et al., Phys. Med. Bull. 2000; 45; 955–969.) Reviews of MRI-mediated dosimetry are provided in MacDougall ND, et al., Phys Med Biol. 2002; 47(20):R107–21 and in McJury, M. et al., Br. J. Radiol. 2000; 73(873):919–29.

Another conventional approach was aqueous gels containing materials to interact with incident penetrating radiation relates to the use of a composition including droplets of superheated liquid encapsulated in a host gel. U.S. Pat. Nos. 4,143,274 and 4,350,607 disclose a radiation detector and dosimeter which is based on the fact that a sufficiently finely-dispersed liquid suspended in a host liquid of high viscosity or gel is stable at temperatures above its normal boiling point for long periods of times. Radiation and particularly neutron radiation of sufficient energy and intensity, upon coming in contact with such droplets can trigger volatilization. The volume of vapor evolved then serves as a measure of radiation intensity and dosage. Some disadvantages of utilizing such a dosimeter include the difficulty in manufacture wherein the superheated liquid is gaseous at room temperature; the limitation that high-energy radiation, e.g. neutron radiation, is necessary to affect volatilization; the inherent low resolution potential of the measurement of gas volumes.

Still another approach utilizing uniformly dispersed droplets of a very high vapor pressure liquid within an aqueous gel is described in U.S. Pat. No. 4,779,000 which discloses a dosimeter for gamma rays, microwaves, and other low linear energy transfer (LET) radiation. Upon interaction with low-level radiation the droplets "explode" into volatilized gas, and observation of bubbles in the medium serves as detection. In another approach, a 3D dosimeter was fabricated from an aqueous gel containing molecules which polymerize with each other in the presence of radiation, thus forming a detectable and quantifiable image. U.S. Pat. Nos. 5,321,357 and 5,633,584 disclose systems in which soluble monomers are induced to polymerize only in those portions of the dosimeter experiencing radiant or mechanical energy. The resulting polymeric portions induce a change in the relaxation rate of nearby water molecules, allowing visualization and quantitation by MRI. Some disadvantages accompanying use of this invention include the potentially serious toxicity of components used to prepare the article, difficulties in the manufacture wherein oxygen must be necessarily excluded, and the need for expensive MRI instrumentation for the interpretation of results.

Other systems have been disclosed in which a 3D dosimeter has been fabricated utilizing a polymeric matrix containing therein materials which are altered in their optical properties through exposure to incident penetrating radiation. U.S. Pat. Nos. 5,319,210 and 5,498,876 provide a dosimetry method characterized by the steps of storing information in a three dimensional optical memory element, then exposing the optical memory element to neutron or other high LET radiation to alter the information stored in the optical memory element as a function of the radiation to which the optical memory element is exposed, and then retrieving the altered information from the optical memory element for subsequent analysis. The altered information is used to provide a measure of both the radiation dose and energy. Some disadvantages associated with the practice of this invention for 3D dosimetry include the necessity and limitations of obtaining a pre-formulated commercial polymer doped with light-sensitive chemical; difficulty in utilizing the process wherein the dosimeter is exposed by high-energy radiation in a separate process subsequent to the capture of data in the optical memory unit; the need for a third process to retrieve altered information in order to measure and quantify the original radiative event(s). A similar system for optical storage of data in three dimensions was described. (See Parthenopoulos, D. and Rentzepis, P., Science 1989; 245:843–845.) U.S. Pat. No. 6,621,086 relates to utilizing color-forming materials imbedded in an aqueous gel which, upon exposure to radiation, form permanent insoluble colored areas to be used for quantification of the original radiation dose levels. Some of the disadvantages of utilizing this invention include the limitation of employing aqueous gels, the high relative cost of the color-forming tetrazolium salts, and the relative insensitivity of the method. A 3D data storage system is disclosed in U.S. Pat. No. 4,288,861 wherein active photoreactant molecules dispersed in a fluid media are simultaneously or sequentially excited by two discreet optical beams trained at a target location within the media, giving rise to a photochemical reaction which produces physical or refractive index inhomogeneities. The data is scanned in a second operation.

SUMMARY OF THE INVENTION

This invention relates to a method of forming a radiation-generated, three-dimensional dosimetric map in a solid translucent or transparent polymer and to an article of manufacture comprising a polymer formulated to capture data imparted by incident penetrating radiation. The present invention provides a method of preparation of a solid translucent or transparent polymer matrix capable of detecting and displaying a penetrating radiation field within the polymeric matrix which is measurable and quantifiable by various known procedures. The 3D dosimetric map thus formed is representative of the 3D energy field to which the plastic had been exposed and can be quantified at high spatial resolution, thereby providing an accurate, stable, storable record in three dimensions of the radiation exposure or dosing event(s).

In one embodiment, the present invention provides a method of preparation and method of use of a solid, dimensionally stable object comprised of a translucent or transparent polymer comprising one or more reporter molecules, optionally one or more activators, and optionally one or more optional UV stabilizers. The invention is useful in applications which require the monitoring, measurement, calibration, manipulation, recording, tracking, or evaluation of penetrating radiation. The invention provides in some embodiments a method to bleach, fade, erase, or delete the captured 3D dosimetric map thereby providing a reusable device.

The present invention provides a solid dosimeter capable of recording a dosimetric data in 3D space which has high spatial resolution, a high degree of accuracy and precision, a high degree of stability with respect to diffusion of the image over time, and a relative insensitivity to room light, thereby providing a device containing 3D data which may be measured, processed, or analyzed at a time convenient to the practitioner and which can be stored or archived for long periods of time.

The present invention provides a dosimeter which is capable of measuring the absolute value of the absorbed dose of radiation, measuring isodose curves, and measuring depth-dose distributions. The present invention further provides a dosimeter useful in providing a 3D dosimetric map under conditions of low-energy and/or low-duration radiation. The 3D dosimetric map captured within the device of the invention can be measured, analyzed, or quantified by one of several means known to those skilled in the art. These include, but are not limited to, simple spectroscopy, scanning densitometry, and tomographic analysis which might utilize a variety of illumination sources, detectors, and software. Thus the dosimetric data captured in the practice of the invention might be analyzed or interpreted by manipulating a series of two-dimensional scans achieved through the use of polychromatic white light, monochromatic laser light, or another light source with the aid of any of several detection schemes including, but not limited to, spectrophotometry, densitometry, or digital imaging.

The invention will be more fully described by reference to the following drawings.

DETAILED DESCRIPTION OF THE INVENTION

Figure 1:
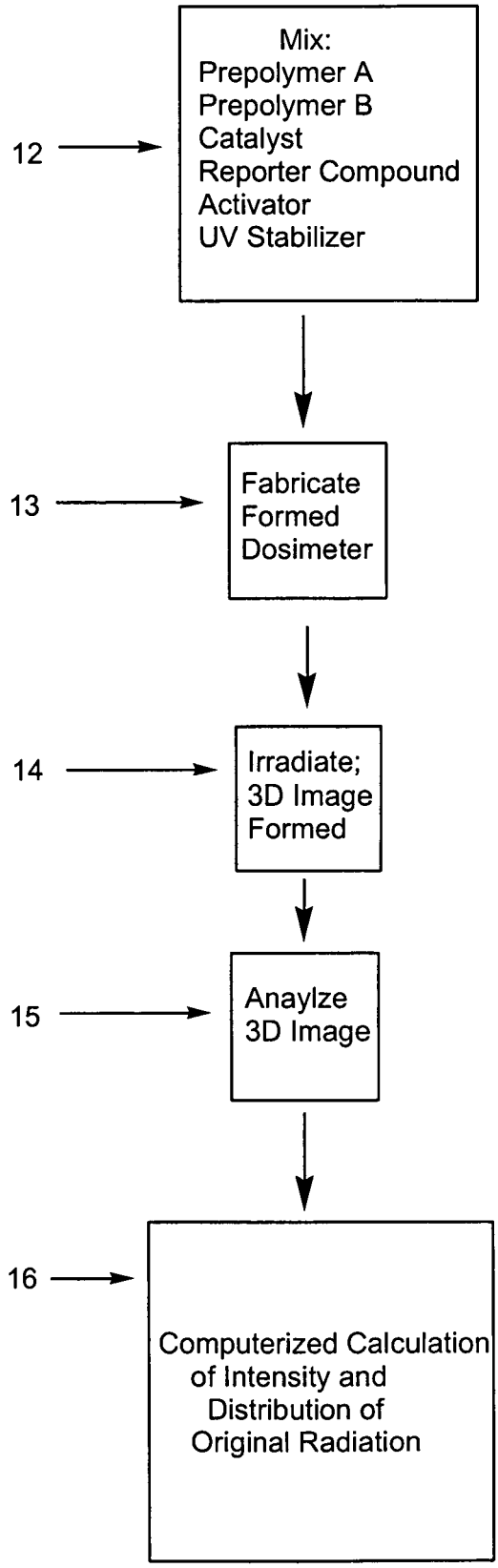
FIG. 1 is a flow chart of a method for fabricating and use of a three-dimensional dosimeter in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

The present invention relates to the discovery of a method of fabrication and use of a dosimetric system in which the optical properties of a solid, three-dimensional polymeric matrix are altered as a result of the impact of incident penetrating radiation upon the matrix. Data thus captured by the matrix are a high-resolution representation of the incidence and distribution of the radiant energy and constitute a three-dimensional dosimetric map device.

The present invention provides shaped solid dosimeter formed from a translucent or transparent polymer and one or more reporter molecules homogeneously and uniformly dispersed throughout. A reporter is defined herein as a chemical entity which undergoes a predictable and quantifiable change in optical properties as a direct or indirect result of incident radiation. This change in optical properties includes, but is not limited to, a significant shift in the absorbance of electromagnetic radiation in the IR-UV-visible spectrum, changes in refractive index, and changes in fluorescence behavior.

One or more activators can also be disbursed throughout the dosimeter. An activator is defined herein as a chemical entity which readily forms a radical or a cation or an anion upon interaction with radiant energy. The radical or cation or anion thus formed can interact with a reporter compound, giving rise to a change in optical properties of the reporter compound as an indirect result of incident radiation.

Optionally, one dosimeter device can include one or more UV stabilizers. A UV stabilizer is defined herein as a chemical entity known to inhibit degradation of the product of the invention by interfering with deleterious action of UV light on the product of the invention.

The transparent or translucent polymer can be selected from a set of polymeric materials generally known as optical plastics. Many of these optical plastics are available commercially and are known also by their Trade Names. This set of materials includes, but is not limited to, acrylics (for example polymethylmethacrylate, PMMA, known as Lucite, Plexiglass, and OptiGuide; polyacrylonitrile, and the family of ethylene/methacrylic acid ionomers known as the Surlyns), polystyrene (known as Dylene, Styron, and Lustrex), polyacetal (known as Delrin and Ultraform), cyclic olefin copolymer (COC, known as Topaz and Zeonor), polycarbonate (known as Lexan and Merlon), epoxy resins, silicones and siloxanes, polymethylpentene (TPX), polyester (known as Mylar), polysulfone (known as Udel), and polyurethane. This set of materials also includes copolymers (for example, styrene acrylonitrile, known as Lustran and Tyril), terpolymers (for example acrylonitrile, butadiene, styrene), and blends of two or more optical plastics.

The dosimeter can be fabricated by admixing and causing to be uniformly and homogeneously dispersed, one or more reporter molecules, optionally, one or more activators, and optionally one or more UV stabilizers into a melt of the transparent or transparent polymer followed by a step of cooling and solidifying within a mold to provide the solid molded product.

Alternatively, the dosimeter can be fabricated by admixing and causing to be uniformly and homogeneously dispersed, one or more reporter molecules, optionally, one or more activators, and optionally one or more UV stabilizers into a solution of the transparent or transparent polymer in an appropriate solvent, followed by steps of evaporating and solidifying within a mold to provide the solid molded product.

A third method of formulating the dosimeter provides an increased level of control of the temperature, mixing, molding, and curing parameters of the fabrication of the dosimeter. In this method, one or more chemical precursors to the polymeric product, such as prepolymers, are mixed with one or more polymerization catalysts, one or more reporter molecules, optionally one or more activators, and optionally one or more UV stabilizers to provide a mixture which is placed into molds and allowed to polymerize under controlled conditions, thereby providing the solid molded dosimeter.

Prepolymers are defined herein as chemically complimentary precursors which form, under the reaction conditions of the invention, a copolymer, also referred herein as translucent or transparent polymer, possessing desirable and useful physical properties necessary to practice the invention. A polymerization catalyst is defined herein as a chemical entity to accelerate the copolymerization of the prepolymers, enabling the process to take place under controlled conditions of reaction temperature and duration.

In this method, the optical plastic is synthesized in situ from monomeric or oligomeric precursor(s) in the presence of the other chemical components of the present invention. The nature of the precursor(s) and the catalyst to promote the polymerization reaction are dictated by the choice of the optical plastic, and are known to those of ordinary skill in the art. In this method, the present invention can provide a process for a controlled reaction rate between the prepolymers for optimizing heat released by the reaction during the process, time required to complete the process, and physical parameters defining the product polymer.

The present invention provides a process in which the reporter molecule(s) contained within the polymer product remain in an original, native, or leuco state throughout the manufacturing process, and are not altered in its molecular structure by the process. The present invention also provides a product containing within the polymeric matrix one or more activators which, upon interaction with absorbed radiation, facilitates the change in optical properties of the reporter molecule, thus giving rise to a 3D dosimetric map. The present invention further provides a process in which optional UV stabilizer(s) which can be contained within the polymer product and remain structurally unchanged by the conditions of the manufacture of the product.

A. Prepolymers

Prepolymers useful for this invention include chemically complimentary prepolymers so that, upon mixing and incubation under the conditions of the present invention, a polymeric product with desirable and useful properties is formed. One embodiment of the present invention provides a polyurethane product. In this embodiment, a Prepolymer A is a diisocyanate and a Polymer B is a polyol. In the polymerization process, a hydroxyl group of the polyol reacts with one isocyanate group of the diisocyanate to form a urethane bond. Polymerization proceeds as this reaction goes toward completion.

1. Prepolymer A: Diisocyanate

Diisocyanates which can be used in the present invention include monomeric diisocyanates and prepolymer mixtures containing isocyanates. Monomeric diisocyanates are defined herein as discreet, definable, characterizable molecules containing two isocyanate groups having a molecular weight less than about 500 daltons. Monomeric diisocyanates are reactive substances containing two isocyanate groups which are not oligomeric or polymeric in nature. Suitable monomeric diisocyanates which can be used in the present invention include aryl diisocyanates, aliphatic diisocyanates, cycloalkyl diisocyanates, and heterocyclic diisocyanates.

Alternatively, a molecule possessing more than two isocyanate groups as Prepolymer A can be used in the present invention. Suitable polyisocyanate prepolymers include isocyanate trimers, biurets having three isocyanates, or other compositions in which three isocyanates are employed.

Prepolymer mixtures containing isocyanates are herein defined as mixtures of products arising from the reaction of one or more the above mentioned monomeric diisocyanates with one or more polyhydroxylated molecule. Prepolymer mixtures containing isocyanates are further defined herein as mixtures of products containing isocyanate groups. A polyhydroxylated molecule is herein defined as an organic compound possessing two or more hydroxyl groups. Prepolymer mixtures containing isocyanates contain varying degrees of unreacted isocyanate groups and are reactive with Prepolymer B variants to form the product of the present invention. Many said Prepolymer mixtures containing isocyanates are available commercially and their exact chemical compositions are often protected as Trade Secrets. The Prepolymer mixtures containing isocyanates can also be prepared from reaction of one or more of the above mentioned monomeric diisocyanates with one or more of the polyols described above using one of several methods known to those of ordinary in the art. For example, Prepolymer A can include alkyl diisocyanates, cycloalkyl diisocyanates and commercially available Prepolymer mixtures containing isocyanates. Alkyl diisocyanates and cycloalkyl diisocyanates which are useful for the present invention include, but are not limited to, isophorone diisocyanate, 1,6-hexamethylene diisocyanate, methylene dicyclohexyl diisocyanate, xylylene diisocyanate, trans-1,4 cyclohexane diisocyanate, tetramethyl xylylene diisocyanate, isopropenyl dimethylbenzyl diisocyanate, trimethylhexamethylene diisocyanate, 2,2,4-(2,4,4)trimethylhexamethylene diisocyanate, ethylene diisocyanate, 1,4-tetramethylene diisocyanate, 1,12-dodecane diisocyanate, cyclobutane-1,3 diisocyanate, cyclohexane-1,3 diisocyanate, cyclohexane-1,4 diisocyanate, 1-isocyanato-3,3,5-trimethyl-5-isocyanoatomethyl cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, and norbornane diisocyanate. Polyisocyanates useful for the present invention include, but are not limited to, isophorone diisocyanate trimer (available commercially as Tolonate IDT-70, a product of Rhodia PPMC and as Desmodur Z4470, a product of Bayer AG), hexamethylene diisocyanate trimer (available commercially as Tolonate AT, a product of Rhodia PPMC and as Desmodur N3390, a product of Bayer AG), and biurets and allophanates based on the diisocyanates exemplified supra. Commercial Prepolymer mixtures containing isocyanates which are useful in the reaction include, but are not limited to, Isocyanate-terminated PTMEG prepolymer (Bayer Baytec WE-180), Isocyanate-terminated PPG Polyether Prepolymer (Bayer WP-260); Crystal Clear 200 Part A (Smooth-On, Inc.), Crystal Clear 206 Part A (Smooth-on, Inc.), Crystal Clear 220 Part A (Smooth-On, Inc.), UR5560 Resin Part A (Electrolube), Z-7681M1 Part B (Development Associates, Inc.), PolyOptic 14–10 Part A (PolyTech Development Corp.), PolyOptic 14–20 Part A (PolyTech Development Corp.), PolyOptic 14–70 Part A (PolyTech Development Corp.), ConOptic 2020 Part A (Cytec), ConOptic 2060 Part A (Cytec), Aliphatic Diisocyanate Prepolymer (Development Associates). Alkyl diisocyanates which can be used in the present invention include 1,6-hexamethylene diisocyanate and tetramethylene diisocyanate. Cycloalkyl diisocyanates which can be used in the present invention include hexamethylene diisocyanate, isophorone diisocyanate and methylene dicyclohexyl diisocyanate. Suitable polyisocyanates for use in the present invention include Tolonate IDT-70 and Tolonate AT. Commercial Prepolymer mixtures containing isocyanates which can be used in the present invention include Isocyanate-terminated PPG Polyether Prepolymer (Bayer WP-260) and Crystal Clear 200 Part A (Smooth-On, Inc.), PolyOptic 14–70 Part A, ConOptic 2060 Part A, and Crystal Clear 206 Part A (Smooth-On, Inc.).

2. Prepolymer B: Polyol

Prepolymers B which can be used in the present invention are reactive substances containing at least two isocyanate-reactive groups attached to a single molecule. One embodiment of the present invention provides hydroxyl groups as the isocyanate-reactive functionality. Polyol is herein defined as an organic molecule or mixture of molecules in which two or more hydroxyl groups are attached to the same molecule. Polyols which can be used in the present invention include monomeric polyols and polymeric polyols. Monomeric polyols are defined herein as hydrocarbons possessing an all-carbon chain substituted with two or more hydroxyl groups having molecular weights less than 500 daltons. Polymeric polyols are herein defined as polyethers, polyesters, or polycarbonates substituted with two or more hydroxyl groups. Monomeric polyols which can be used in the invention include, but are not limited to, ethylene glycol, propylene glycol, 1,3-propanediol, neopentyl glycol, glycerol, pentaerythritol, 1,3-butanediol, 1,4-butanediol, trimethylolpropane, trimethylolethane, dimethyl tartrate, dibutyl tartrate, 1,5-pentanediol, 1,6-hexanediol, 1,10-decanediol, cyclopentanediol, cyclohexanediol, cyclopentanedimethanol, cyclohexanedimethanol, allose, altrose, gulose, mannose, galactose, idose, glucose, talose, fructose, mannitol, sorbitol, benzene 1,3-dimethanol, benzene-1,4-dimethanol, 1,2,4-butanetriol, 2-(hydroxymethyl)-1,3-propanediol, methyl glucopyranoside, methyl galactopyranoside, and methyl mannopyranoside. Monomeric polyols which can be used in the present invention include 1,3-propanediol, glycerol, pentaerythritol, 1,3-butanediol, 1,4-butanediol, 1,5-pentanediol, 1,6-hexanediol, 1,10-decanediol, cyclopentanediol, cyclohexanediol, cyclohexanedimethanol, and sorbitol.

Suitable polymeric polyols which can be used in the present invention include hydroxyl-terminated polyether polyols, hydroxy-terminated polyester polyols, and hydroxy-terminated polycarbonate polyols. Hydroxy-terminated polyether polyols useful in the present invention are the products of reaction between monomeric polyols such as ethylene glycol, propylene glycol, 1,3-propanediol, neopentyl glycol, glycerol, pentaerythritol, 1,3-butanediol, 1,4-butanediol, trimethylolpropane, trimethylolethane, dimethyl tartrate, dibutyl tartrate, 1,5-pentanediol, 1,6-hexanediol, 1,10-decanediol, cyclopentanediol, cyclohexanediol, cyclopentanedimethanol, cyclohexanedimethanol, allose, altrose, gulose, mannose, galactose, idose, glucose, talose, fructose, mannitol, sorbitol, benzene 1,3-dimethanol, benzene-1,4-dimethanol, 1,2,4-butanetriol, 2-(hydroxymethyl)-1,3-propanediol, methyl glucopyranoside, methyl galactopyranoside, and methyl mannopyranoside and a cyclic ether such as ethylene oxide, propylene oxide, 1,2-epoxybutane, 1,2-epoxypentane, 1,2-epoxyhexane, trimethylene oxide, cyclopentene oxide, cyclohexene oxide, 2-methyloxetane, 3-methyloxetane, 3,3-dimethyloxetane, dimethyltetrahydrofuran, or tetrahydrofuran. Many of the hydroxy-terminated polyether polyols are available commercially. The hydroxy-terminated polyether polyols can also be prepared by methods known to those skilled in the art by reaction of monomeric polyols with cyclic ethers. Hydroxy-terminated polyether polyols useful in the reaction include, but are not limited to, polybutadiene glycol (polyBD), polytetramethylene etherglycol (PTMEG), polypropylene oxide glycol (PPO), and polybutylene oxide glycol (PBO), Tone Prepolymers (Dow Chemical).

Hydroxy-terminated polyester polyols which can be used in the present invention are the condensation products of reaction between monomeric polyols such as ethylene glycol, propylene glycol, 1,3-propanediol, neopentyl glycol, glycerol, pentaerythritol, 1,3-butanediol, 1,4-butanediol, trimethylolpropane, trimethylolethane, dimethyl tartrate, dibutyl tartrate, 1,5-pentanediol, 1,6-hexanediol, 1,10-decanediol, cyclopentanediol, cyclohexanediol, cyclopentanedimethanol, cyclohexanedimethanol, allose, altrose, gulose, mannose, galactose, idose, glucose, talose, fructose, mannitol, sorbitol, benzene 1,3-dimethanol, benzene-1,4-dimethanol, 1,2,4-butanetriol, 2-(hydroxymethyl)-1,3-propanediol, methyl glucopyranoside, methyl galactopyranoside, and methyl mannopyranoside and dicarboxylic acids such as succinic acid, glutaric acid, pimelic acid, azelaic acid, suberic acid, sebacic acid, phthalic acid, isophthalic acid, terephthalic acid, dimethylpropionic acid, dimethhylbutyric acid, trimethylbutyric acid, maleic acid, 1,2-phenylene diacetic acid, 1,3-phenylene diacetic acid, 1,4-phenylenediacetic acid, cyclohexanedicarboxylic acid, cyclopentanedicarboxylic acid, 3-hexenedioic acid, 2-pentenedioic acid, 1,3-butadiene-1,4-dicarboxylic acid, 3-hexyne-1,6-dicarboxylic acid, acetylenedicarboxylic acid, 2-cyclohexene-1,4-dicarboxylic acid, or adipic acid. It is well known by those skilled in the art that condensation between monomeric polyols and dicarboxylic acids may be achieved by utilizing dicarboxylic acids or their derivatives including, but not limited to, nitrile, ester, acyl halide, amide, or anhydride. Many hydroxy-terminated polyester polyols are available commercially. The hydroxy-terminated polyester polyols can also be prepared by methods known to those skilled in the art by reaction of monomeric polyols with dicarboxylic acids or derivatives or dicarboxylic acids. Suitable hydroxy-terminated polyester polyols include poly(ethylene glutarate), poly(ethylene adipate), poly(ethylene azelate), poly(trimethylene glutarate), poly(pentamethlene glutarate), poly(diethylene glutarate), poly(diethylene adipate), poly(triethylene adipate), and poly(1,2-propylene adipate).

Hydroxy-terminated polycarbonate polyols which can be used in the present invention are the condensation reaction products between monomeric polyols, such as ethylene glycol, propylene glycol, 1,3-propanediol, neopentyl glycol, glycerol, pentaerythritol, 1,3-butanediol, 1,4-butanediol, trimethylolpropane, trimethylolethane, dimethyl tartrate, dibutyl tartrate, 1,5-pentanediol, 1,6-hexanediol, 1,10-decanediol, cyclopentanediol, cyclohexanediol, cyclopentanedimethanol, cyclohexanedimethanol, allose, altrose, gulose, mannose, galactose, idose, glucose, talose, fructose, mannitol, sorbitol, benzene 1,3-dimethanol, benzene-1,4-dimethanol, 1,2,4-butanetriol, 2-(hydroxymethyl)-1,3-propanediol, methyl glucopyranoside, methyl galactopyranoside, and methyl mannopyranoside and phosgene or carbonates such as dimethyl carbonate, diethyl carbonate, dibutylcarbonate, diphenyl carbonate, di-p-tolylcarbonate, trimethylene carbonate, diallyl carbonate, allyl methyl carbonate, or dimethylene carbonate, or with dioxolanones, bischlorocarbonic acid esters, or ureas. Many of the hydroxy-terminated polycarbonate polyols are available commercially. The hydroxy-terminated polycarbonate polyols can also be prepared by methods known to those skilled in the art by reaction of monomeric polyols with phosgene or with carbonates.

B. Catalyst

In one embodiment of the present invention, wherein a polyurethane optical plastic is synthesized from Preploymer A and Prepolymer B precursors, one or more catalysts can be used which serve to accelerate the rate of the polymerization reaction. The catalyst is chosen to optimize the duration of reaction and the amount of heat liberated during the reaction process. Catalysts which can be used in the present invention include tertiary amines, organometallics, metal salts of carboxylic acids, metal salts of N,N-dimethylformamide, and metal alcoholates. Suitable catalysts include, but are not limited to, amines, metal salts of carboxylic acids, and organometallics. Commercially available Prepolymers described above often contain catalysts. Useful amines include triethylamine; dimethylaminopropionitrile; dimethylbenzylamine; dicyclohexylmethylamine; dimethylcyclohexylamine; N,N,N',N'-tetramethyldiaminodiethyl ether; bis(dimethylaminopropyl) urea; N-methylmorpholine; N-ethylmorpholine; dimethylpiperazine; N-dimethylaminoethylpiperidine; quinuclidene; imidazole; melamine; melamine, compound with glyoxal; pyridine; tetramethylbutanediamine; 1,2-dimethylimidazole; N,N'-dimethylpiperazine; 1-butylimidazole; 1-methylimidazole; dimethylethanolamine; pentamethyl diethylenetriamine; tetramethyl 1,3-propanediamine; tetramethyl 1,6-hexanediamine; tetramethyl ethylenediamine; 2-ethylimidazole; tetramethylguanidine; 1,8-diazabicyclo[5.4.0]undec-7-ene; 1,8-diazabicyclo[5.4.0]undec-7-ene, compound with 2-ethylhexanoic acid; 1,8-diazabicyclo[5.4.0]undec-7-ene, compound with phenol; 1,8-diazabicyclo[5.4.0]undec-7-ene, compound with hydrogen tribromide; 1,8-diazabicyclo[5.4.0]undec-7-ene, compound with p-toluenesulfonic acid; 1-azabicyclo[2.2.2]octane; 1,5-diazabicyclo[4.3.0]non-5-ene; 1,4-diazabicyclo[2.2.2]octane; tetrabutylammonium salts; benzyldimethylaminoethanol; benzyltrimethylammonium salts; 2-(N,N-dimethylaminoethoxy)ethanol; N,N',N''-tris(dimethylaminopropyl)-s-hexahydrotriazine; and triethylenediamine. Useful metal salts of carboxylic acids include potassium acetate, potassium octanoate, sodium acetate, and sodium octanoate. Useful organometallics include dibutyltindioctoate, dibutyltin dilaurate, dibutyltin diacetate, lead octoate, lead neodecanoate, bismuth nitrate, bismuth octoate, bismuth neodecanoate, bismuth napthenate, bismuth versalate, manganese napthenate/pentanedione, manganese octoate, vanadium acetylacetonate, zinc acetylacetonate, tin neodecanoate, stannous 2-ethyl hexanoate, lithium neodecanoate, stannic chloride, stannous octoate, zinc napthenate, zinc octoate, ferric acetylacetonate, zinc acetylacetonate, cobalt octoate, zirconium acetylacetonate, zirconium octoate, zirconium versalate, aluminum acetylacetonate, mercuric acetate, phenylmercuric acetate, phenylmercuric propionate, organopolymercury compounds, and crown ether complexes of Lanthanide metals. Many of the catalysts are commercially available. Commercial mixtures of catalysts useful in the invention include Cocure, Cotin, and Coscat catalysts, (Caschem, Inc.); Niax catalysts (Union Carbide); Polycat catalysts (Abbott Laboratories); Dabco catalysts (Air Products and Chemicals Inc.); Thancat catalysts (Texaco Chemical Co.); Stanclere TL (AKZO Chemicals Inc.); K-Kat Catalysts (King Industries), Curene catalysts (Anderson Development Co.); Bulab 600 catalysts (Buckman Laboratories, Inc.); Optic Part 14× (PolyTech Development Corp.); Metasol catalysts (Calgon Corporation); CC-1 and CC-3 catalysts (Cardinal Carolina Corp.); Conacure catalysts (Conap, Inc.); Cata-check catalysts (Ferro Corp.); KR catalysts (Kenrich Petrochemicals, Inc.); BiCAT catalysts (Shepherd Chemical Co.); Texacat, ZR, ZF, DD, DMDEE catalysts (Texaco Chemical Co.); Thor 535 catalysts (Thor Chemicals, Inc.); Toyocat catalysts (Tosoh USA, Inc.).

C. Activators

Activators useful in the invention include those chemical compounds which form radical, cationic, or anionic species as a direct result of the absorption of radiation. It is within the scope of the invention that in certain embodiments, an activator can be employed to provide for a radical, cationic, or anionic species which in turn fosters the change in optical properties of the reporter molecule. Activators which can be used in the present include chemical compounds which form radical or cationic species upon irradiation. Activators useful in the present invention which form radical species upon the adsorption of radiation include α-hydroxy alkylphenones, acyl phosphine oxides, O-acyl-α-oximinoketones, organic peroxides, phenylgyoxylates, desylarylsulfides, phenyl phenacylsulfides, metallocene derivatives, transition-metal carbonyls, α-amino acids, halogenated hydrocarbons, polyhalogenated hydrocarbons, alkoxyamines, azoalkane derivatives. Activators useful in the invention which form cationic species upon the absorbance of radiation include diazonium salts, diaryliodonium salts, triarylsulfonium salts, dialkylphenacylsulfonium salts, ferrocenium salts, α-sulfonyloxyketones, and silyl benzyl ethers.

Activators suitable for use in the present invention include benzoin ethyl ether; benzoin isopropyl ether; benzoin butyl ethers (isomeric); benzoin isobutyl ether; benzildimethyl ketal; 2,2-diethoxy-1,2-diphenylethanone; 1,1-diethoxyactophenone; 1,1-di(n-butoxy)actophenone; 1-hydroxy-cyclohexyl-phenyl ketone; 2-hydroxy-2-methyl-1-phenyl-propan-1-one; 1-[4-(2-hydroxyethoxy)phenyl]-2-hydroxy-2-methyl-propan-1-one; benzophenone; 2-methyl-1-[4-(methylthio)phenyl]-2-morpholino-propane-1-one; 2-benzyl-2-dimethylamino-1-(4-morpholinophenyl)-butan- 1-one; 2,4,6-trimethylbenzoyl-diphenylphosphine oxide; 2,4,6-trimethylbenzoyl-phenylphosphinic ethyl ester; bis(2, 4,6-trimethylbenzoyl)-phenylphosphine oxide; bis(2,6-dimethoxybenzoyl)-2,4,4-trimethylpentylphosphine oxide; 2,2,2-trichloro-1-[4-(1,1-dimethyl)phenyl]-ethanone; 2,2-dichloro-1-(4-phenoxyphenyl)-ethanone; 4,4'-bis(chloromethyl)benzophenone; phenyl tribromomethylsulfone; methyl benzoyl formate; 2,4,6-rimethylbenzophenone; 4-methylbenzophenone; 4-methylbenzophenone; 4-chlorobenzophenone; 4-(4-methylphenylthio)benzophenone; 3,3'-dimethyl-4-methoxybenzophenone; methyl 2-benzoylbenzoate; 4-phenylbenzophenone; 4,4'-bis(dimethylamino)benzophenone; 4,4'-bis(diethylamino)benzophenone; 2-chlorothioxanthone; 4-chlorothioxanthone; 2-isopropylthioxanthone; 4-isopropylthioxanthone; 2,4-dimethylthioxanthone; 2,4-diethoxythioxanthone; 1-chloro-4-propoxythioxanthone; benzil; 1,7,7-trimethyl-bicyclo[2.2.1]heptane-2,3-dione; 2-ethylanthraquinone; 4-benzoyl-N,N,N-trimethylbenzene methaminium chloride; 2-hydroxy-3-(4-benzoylphenoxy)-N,N,N,-trimethyl-1-propaniminium chloride; 2-hydroxy-3-(3,4-dimethyl-9-oxo-9H-thioxanthon-2-yloxy)-N,N,N-trimethyl propaniminium chloride; 4-(13-acryloyl-1,4,7,10,13-pentaoxatridecyl)benzophenone; 4-benzoyl-N,N-dimethyl-N-[2-(1-oxo-2-propenyl)oxy]ethyl benzenemethaminium chloride; methyldiethanolamine; triethanolamine; ethyl 4-dimethylaminobenzoate; 2-n-butoxyethyl 4-(dimethylamino)benzoate; isoamyl 4-dimethylaminobenzoate; 2-(dimethylamino)ethyl benzoate; tetrachloroethane; carbon tetrachloride; chloroform; dichloromethane; methylene chloride; 1,4-dichloro-2-butene; 2,2'-azobis(isobutyronitrile); 4,4'-azobis(4-cyanovaleric acid); 1,1'-azobis(cyclohexanecarbonitrile); 2,2'-azobis(2-methylpropane), 1,1-dichloropropane; 1,2-dichloropropane; 1,3-dichloropropane; 2,4,5-trichloroimidazole; 2,2-dichloropropane; 1,2-dichlorobutane; 1,3-dichlorobutane; 1,4-dichlorobutane; 1,1,1-trichloroethane; 1,2,2-trichloroethane; 1,2,3-trichloropropane; 1,1,1,2-tetrachloroethane; 1,1, 2,2-terachloroethane; bromoform; methylene bromide; dibromomethane; 1,1-dibromo-2,2-bis(chloromethyl)cyclopropane; 1,2-dibromobutane; 1,3-dibromobutane; 1,4-dibromobutane; 2,3-dibromobutane; 1,4-dibromo-2,3-butanedione; 1,4-dibromo-2-butene; 1-bromo-4-chlorobutane; 1-bromo-2-chloroethane; 1-bromo-6-chlorohexane; bromochloromethane; 1-bromo-5-chloropentane; 1-bromo-3-chloropropane; 2-bromo-1-chloropropane; 1,1,2-tribromoetane; 2,4,5-tribromoimidazole; 1,2,3-tribromopropane; bromodichloromethane; chlorodibromomethane; α-(trichloromethyl)benzyl acetate; diphenyliodonium hexafluorophosphate; 4-methylphenyl-4'-isobutryl iodonium hexafluorophosphate; and ferrocene. Commercially-available activators include Cryacure (Union Carbide), Degacure (Degussa), PS-series (Ashai Denka), SarCat (Sartomer), Rhodorsil (Rhodia), Irgacure (Ciba Specialty Chemicals), Darocur (Ciba Specialty Chemicals), Trigonal (Akzo), Esacure (Fratelli Lamberti), Lucirin (BASF), Photocure (Sunko), Speedcure (Lambsons), Quantacure (Great Lakes), and Kayacure (Nippon Kayaku).

D. Reporter Compounds

Reporter compounds which can be used in the present invention are chemical entities which exhibit a change in optical properties upon the absorbance of radiation or which exhibit a change in optical properties due to the action of hydrogen ions ($H^+$) generated by the absorption of radiation by the medium or by an added activator molecule or which exhibit a change in optical properties due to the action of radical species generated by the absorption of radiation by the medium or by an added activator molecule. Suitable reporter compounds for use in the present invention include spiropyrans, spirothiopyrans, spironapthooxazines, spirobenzopyrans, spiroindolobenzopyrans, chromenes, 2,2,-dichlorchromenes, leuco quinines, anthroquinone dyes, thiazine leuco dyes, oxazine leuco dyes, phenazine leuco dyes, monoarylmethane phthalides, diarylmethane phthalides, triarylmethane phthalides, monoheterocyclic phthalides, bisheterocyclic phthalides, alkenylphthalides, bridged phthalides, bisphthalides, diarylmethanes, triarylmethanes, fluoran leuco dyes, and tetrazolium salts. Reporter compounds used in the present invention include leucomalachite green, leuco crystal violet, black fluoran, green diaminofluoran, red bisindolylphthalide, and orange aminofluoran, crystal violet lactone, and the family of leuco dyes known as Pergascripts (Ciba).

Commercial preparations of reporter compounds include the Reversicol family of dyes (James Robinson, Ltd.) and Photosol family of dyes (PPG Industries).

E. UV Stabilizers

UV stabilizers which can be used in the present invention are compounds which inhibit degradation of the product of the invention by interfering with deleterious action of UV light on the product of the invention. In an embodiment of the present invention, one or more UV stabilizers can be employed to increase the stability of the product of the present invention prior to its irradiation. One or more UV stabilizers can be employed to conserve the dimensional stability, resolution, or accuracy of the image contained within the product of the invention after irradiation and prior to scanning.

UV stabilizers suitable for use in the present invention include antioxidants, UV absorbers, and radical scavengers. Classes of UV stabilizers include benzophenones, phenolics, thiopropionates, trialkyl phosphites, triaryl phosphites, benzoates, benzotriazoles, cyanoacryates, organonickel compounds, organozinc compounds, diphenyl acrylates, cinnamates, and hindered amines. UV stabilizers which can be used in the present invention include menthyl anthranilate; octocrylene; ethylhexyl methoxycinnamate; ethylhexyl salicylate; butylated hydroxytoluene; 2,4,6-tri(2,2-dimethylpropyl)phenol; 2-(2'-hydroxy-3'-tert-butyl-5'-methyl)-5-chlorobenzotriazole; thiodipropionate polyester; dilauryl thiodipropionate; tris(nonylphenyl)phosphite; 2,4-dihydroxybenzophenone; 2-hydroxy-4-methoxybenzophenone; 2-hydroxy-4-octyloxybenzophenone; 2-hydrox-4-metyloxy-benzophenone-5-sulfonic acid; 2-(2-hydroxy-5-tert-octylphenyl)benzotriazole; 2-hydroxy-4-n-octlyoxybenzophenone; 2-(2'-hydroxy-3',5'-di-tert-amylphenyl)benzotriazole; 2-(2H-benzotriazole-2-yl-4-methylphenol; bis(1,2,2,6,6-pentamethyl-4-piperidinyl)sebacate; methyl (1,2,2,6,6-pentamethyl-4-piperidinyl)sebacate. Commercial preparations of UV stabilizers include the UVAPEX group of products (Apex Chemical Co.), the Benzotriazole UV Absorber group of products (Wujiang Dongfeng Chemical Co., Ltd.), the Chimassorb group of products(Ciba), the Tinuvin group of products (Ciba), the BLS group of products (Mayzo, Inc.), the TDP stabilizers (Eastman), the Hisorb group of products (LG Chem, Ltd.), and the Uvinal group of products (Ciba).

FIG. 1 is a flow diagram of a method for manufacture and use of a three-dimensional dosimeter 10. In block 12, the chemical components are mixed in proper ratios. For example, in an embodiment of the present invention in which a polyurethane optical plastic is synthesized, Prepolymer A, Prepolymer B, one or more catalysts, one or more reporter molecules, one or more activators, and one or more optional UV stabilizers are selected. See FIG. 1 for a schematic representation of this process. The resulting mixture is placed in a mold having dimensions appropriate to the application of use. In block 13, the mixture is allowed to polymerize under controlled conditions. For example, the mixture is incubated in the mold under controlled conditions of temperature, pressure, and duration. Suitable parameters are disclosed within the Examples. At the appropriate time the solid, transparent or translucent dosimeter is released from the mold. Alternatively, steps 12 and 13 can comprise the steps of mixing pre-polymerized chemical components of the invention into a melt or a solution and solidifying the dosimeter by cooling or evaporation of solvent, respectively. In block 14, the dosimeter is subjected to penetrating radiation and 3D dosimetric data is captures within the dosimeter. In order to assess, measure, calibrate, or evaluate a field of penetrating radiation the 3D dosimetric data is captured for a duration of time appropriate to the application of use. At the end of the exposure period, a 3D dosimetric map will have formed within the dosimeter. In block 15, the dosimetric map formed in block 14 is analyzed. In block 16, the amount and distribution of radiation received by the dosimeter can be calculated. For example, block 16 can be implemented by a computer algorithm which electronically reconstructs two-dimensional "slices" measured in block 16 into a 3D data set and display on a computer monitor or other conventional methods which are known in the art. Thus, the process provides a means to produce an accurate record with a high degree of special resolution of the quantity and distribution of radiation to which the dosimeter was exposed in block 14. The method of analysis of the dosimeter data can depend upon the physical dimension of the dosimeter, the nature of the original penetrating radiation, and application of use. For example, the dosimetric map can be analyzed using a spectrophotometric technique. Alternatively, the dosimetric map can be analyzed through the use of scanning densitometry or computerized tomography.

An application in which the invention is useful concerns the pretreatment calibration and mapping of a regimen for radiotherapy in human disease. In this application, the 3D dosimetric map captured within the dosimeter can be complex and advanced methods of analysis are used in order to provide information with the requisite detail and resolution. The complex 3D dosimetric map can be analyzed by digital imaging techniques known to those skilled in the art. For example, the dosimetric map can be analyzed by an optical tomographic scanner as described in U.S. Pat. No. 6,218,673, hereby incorporated by reference into this application, in which optical density projections, gleaned at various angles through the photodiode detection of laser light interacting with the image, produce a series of two-dimensional images.

Figure 2:
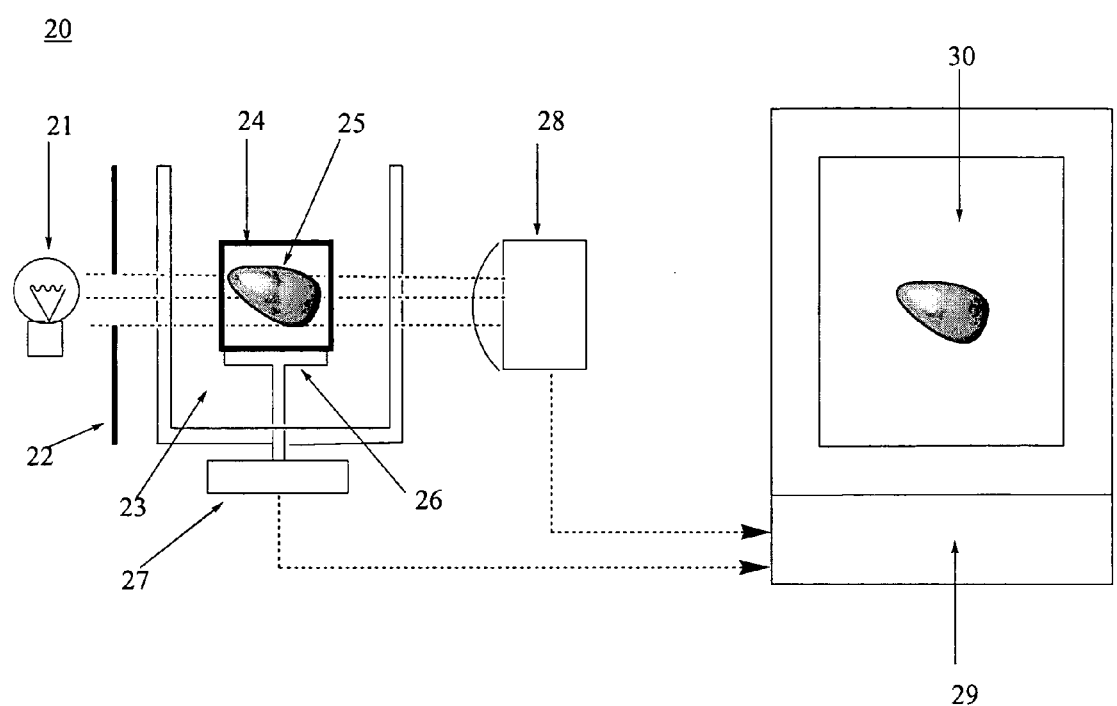
FIG. 2 is a schematic diagram of a system for using the three-dimensional dosimeter for tomographic digital data analysis and reconstruction.

FIG. 2 is a schematic diagram of a system comprising the three-dimensional dosimetric device 20. This comprises a method of use of the invention correlating to blocks 15 and 16 of FIG. 1, which is useful for pretreatment dosimetry for radiotherapy in human disease. This schematic shows and arrangement of a light source, the dosimeter of the invention, a digital detector, and a computer which controls the process. Light source 21 provides uniform illumination to dosimeter 24. Collimator 22 modifies undesirable reflection of light from other parts of device 20. Tank 23 contains a solvent possessing the same refractive index as the dosimeter, to avoid refraction of incident light from light source 21 thereby insuring a parallel path of light through device 20. Dosimeter 24 contains a 3D dosimetric map 25 formed by irradiation as described in block 14 of FIG. 1. Dosimeter 24 is mounted upon turntable 26 which is controlled by motor 27. During the analysis, dosimeter 24 is rotated through a large number of discreet small angle increments. The interaction of light from light source 21 with the 3D dosimetric map 25 is detected at each of the discreet angle presentations using image capturing device 28. For example, image capturing device 28 can be a Charge Coupled Device (CCD) or Complementary Metal-Oxide Semiconductor (CMOS) sensor based camera or similar image capture devices. Computer processing unit 29 is programmed to actuate motor 27, causing rotation of dosimeter 24 and turntable 26. At each of the discreet angles, computer processing unit 29 is programmed to upload and store the digital image captured by imaging capturing device 28. At the completion of the rotation and image capture, computer processing unit 29 is programmed to add each stored image in a tomographic fashion. This produces a digital representation of the total dose and distribution of the original radiation, which can be displayed as image 30 on a display computer. Accordingly, the entire process of analysis comprises taking a series of carefully controlled digital images which are assembled by a computer into a useful 3D digital array of information.

System 20 can be used in pretreatment planning in Conformal Radiation Therapy, pretreatment planning in Vascular Brachytherapy, or pretreatment planning in HDR Brachytherapy of breast cancer, prostate cancer, or lung cancer, or pretreatment planning in Intensity Modulated Radiation Therapy (IMRT), or pretreatment planning in Boron Neutron Capture Therapy (BCNT), or pretreatment planning in Brachytherapy, or pretreatment planning in Permanent Seed Brachytherapy.

There are numerous applications for a dosimetric technique that can accurately measure radiation dose distributions in three dimensions with high spatial resolution. Applications in which the 3D dosimeter measuring uniform penetrating radiation of the present invention would be of value include, but are not limited to, worker protection in radioactive environments; monitoring and assessment of harmful natural radiation in various environments on the Earth, under the surface of the Earth, and in Space; Radiation Hardness Testing; Hot Particle monitoring, monitoring and validation of medical device sterilization by radiation; monitoring and recording of solar UV light, monitoring and validation of food irradiation, blood irradiation, and radiation processing. Applications in which the 3D dosimeter measuring non-uniform penetrating radiation of the present invention would be of value include, but are not limited to, 3D information storage and retrieval systems, diagnostic imaging in human health and disease, and directed radiation therapy in medicine. The latter includes, but is not limited to, dose planning, dose mapping, dose calibration, dose simulation, dose calculation, dose optimization and dose verification systems for 3D Conformal Radiation Therapy, Intensity-Modulated Radiation Therapy, Ophthalmic Applicators, Tissue-metal dental interfaces, Stereotactic Radiosurgery, Gamma Knife Radiosurgery, High-dose Protein inactivation, measurement of clinical proton beams, Intracavity Brachytherapy, Seed Implant Brachytherapy, Carbon Ion Therapy, Intravascular Brachytherapy, Photodynamic Laser Therapy, thermal neutron therapy, Boron Neutron Capture Therapy, and the implementation of therapeutic radionuclides for bone palliation. Uniform penetrating radiation is herein defined as that radiation which is spatially invariant over the time of the exposure. Non-uniform radiation is herein defined as that radiation which is attenuated, modulated, varied, or altered in intensity, duration, geographic distribution, dose, or power by means including, but not limited to manipulation of beam sizes, beam arrangements, dose power, dose duration, dose protocols, and manipulation of leaves, collimators, windows, apertures, gantry, or treatment table.

In some applications it may be desirable to bleach, fade, or erase the 3D dosimetric map formed within the dosimeter, rendering the device capable of reuse. One non-limiting way this may be accomplished is by warming the exposed dosimeter under controlled conditions.

An advantage of the present invention is that it provides a 3D dosimetric map formed by irradiation which exhibits a high degree of resolution. In general, an advantage of the present invention is that it provides a 3D dosimetric map formed by irradiation which exhibits a high degree of image stability and integrity. Another advantage of the present invention is that it provides a 3D dosimetric map formed by irradiation which upon analysis by one of several means known to those skilled in the art accurately reconstructs the irradiation event. Another advantage of the present invention is that it provides a transparent or translucent plastic dosimeter which can be fabricated into any shape, is homogeneous across all dimensions, and can be irradiated and analyzed without the aid of a container. Another advantage of the present invention is that it provides a transparent or translucent plastic dosimeter which contains a 3D dosimetric map formed by irradiation which is stabilized by elements of the invention against loss of data due to premature fading, bleaching, or whitening of the contained image. Another advantage of the present invention is that it provides a transparent or translucent plastic dosimeter which contains a 3D dosimetric map formed by irradiation which is stabilized by elements of the invention against loss of data due to unintended changes in the optical attributes of the polymeric media due to exposure to the environment. Another advantage of the present invention is that it provides a robust and safe process of manufacture which can be practiced without the need to exclude water or oxygen. Another advantage of the present invention is that it provides a dosimeter capable of accurately measuring the absolute dose of radiation.

EXAMPLES

Materials used were obtained from the following manufacturers: Crystal Clear 206 Part A, 200 Part B, 220 Part A, 220 Part B from Smooth-On, Inc., Easton, Pa.; carbon tetrachloride, chloroform, bromochloromethane, tribromopropane, dibromohexane, benzoylmethylene blue, benzoyl peroxide, dichloromethane, butyl acetate, 4,4'-methylene bis(cyclohexyl isocyanate) (HMDI), azobis (isobutyrylnitrile), crystal violet lactone, leuco crystal violet, and leucomalachite green from Sigma-Aldrich, St. Louis, Mo.; Poly-Optic 14–70 Part A, Poly-Optic 14–70 Part B, and Optic Part 14X catalyst from PolyTech Development Corp, Easton, Pa.; Andur prepolymers (Andur AL62DP) from Anderson Development Co., Adrian, Mich.; Aliphatic Isocyanate Prepolymer and Z-8002 Polyol from Development Associates, North Kingstown, R.I.; Tolonate XIDT-70B polyisocyanate trimer from Rhodia PPMC; Tone 32B8 Polyol from Dow Chemical Co.; ConOptic 2020 Part A and ConOptic 2020 Part B from Cytec; Hisorb 944 and Hisorb 328 from LG Chem, Ltd.

Example 1

Crystal Clear 206 Part A (250 g), Crystal Clear 206 Part B (200 g), carbon tetrachloride (180 g), Optic Part 14X catalyst (0.6 ml) and leucomalachite green (16 g) were blended thoroughly in a 1000 ml polyethylene beaker until the mixture was homogeneous. The mixture was then immediately poured into molds. The molds were either glass or polyethylene 30 ml vials. The filled molds were then placed under 60 psi pressure and maintained at 25° C. for 18 hours. This was achieved by arranging the molds within a pressure pot of the appropriate size and pressurizing with a compressor pump. At the end of this period, the solid dosimeters formed in polyethylene vials were removed from the molds.

Example 2

In order to assess the dose response of the conversion of the leuco dye of the present invention to the amount of radiation encountered, dosimeters as described in Example 1 were subjected to graded doses of 145 kVp x-rays at three different dose rates, 0.66 Gy/min, 2.17 Gy/min, and 4.4 Gy/min, using Torrex 150D X-ray unit (EG&G, Long Beach, Calif.). The irradiated dosimeters were evaluated using the commercially available OCT-OPUS™ CT scanner (MGS Research, Inc., Madison, Conn). In this analysis the conversion of leucomalachite green to the colored species is detected as an increase in optical density at 633 nm, a wavelength at which the leuco dye does not absorb. The transformation of leucomalachite green to its colored form was linear with dose and independent of dose rate.

Example 3

4,4'-methylene bis(cyclohexyl isocyanate) (HMDI) (94 g), carbon tetrachloride (90 g), Crystal Clear 206 Part B (80 g), leucomalachite green (4.0 g) and Optic Part 14× catalyst (1.0 ml) were blended thoroughly in a 1000 ml polyethylene beaker. The mixture was then immediately poured into mold fabricated from a 500 ml cylindrical polyethylene beaker. The filled mold was pressurized as in Example 1 and incubated at 25° C. for 20 hours. The solid dosimeter was then removed from the mold.

Example 4

HMDI (82 g), Andur 62 Polyol (12.8 g) carbon tetrachloride (43 g), a solution of leucomalachite green (1.5 g) in carbon tetrachloride (15 g), Crystal Clear 206 Part B (84 g), and Optic Part 14X catalyst (0.5 ml) were blended thoroughly in a 1000 ml polyethylene beaker. The mixture was then immediately poured into mold fabricated from a 500 ml cylindrical polyethylene beaker. The filled mold was pressurized as in Example 1 and incubated at 25° C. for 4 hours. The solid dosimeter was then removed from the mold.

Example 5

HMDI (60 g), Andur 62 Polyol (47.5 g) carbon tetrachloride (35 g), a solution of leucomalachite green (1.5 g) in carbon tetrachloride (15 g), Crystal Clear 206 Part B (82 g), and Optic Part 14X catalyst (0.5 ml) were blended thoroughly in a 1000 ml polyethylene beaker. The mixture was then immediately poured into mold fabricated from a 500 ml cylindrical polyethylene beaker. The filled mold was pressurized as in Example 1 and incubated at 25° C. for 4 hours. The solid dosimeter was then removed from the mold.

Example 6

HMDI (406 g), carbon tetrachloride (200 g), leucomalachite green (6.0 g), Crystal Clear 206 Part B (350 g), and Optic Part 14X catalyst (1.0 ml) were blended thoroughly in a 1000 ml polyethylene beaker. The mixture was then immediately poured into mold fabricated from a 1000 ml cylindrical polyethylene beaker. The filled mold was pressurized as in Example 1 and incubated at 25° C. for 20 hours. The solid dosimeter was then removed from the mold.

Example 7

Anderson Development Inc. Andur AL62DP aliphatic Isocyanate Prepolymer (380 g), carbon tetrachloride (200 g), Z-8002 Part A Polyol (380 g), and leucomalachite green (6.0 g) were blended thoroughly in a 1000 ml polyethylene beaker. The mixture was then immediately poured into mold fabricated from a 1000 ml cylindrical polyethylene beaker. The filled mold was pressurized as in Example 1 and incubated at 25° C. for 20 hours. The solid dosimeter was then removed from the mold.

Example 8

Tolonate XIDT-70B (70% solution in butyl acetate, 248.5 g), Crystal Clear 206 Part B (97 g), carbon tetrachloride (93 g), leucomalachite green (13 g) and Optic Part 14X catalyst (0.4 ml) were blended thoroughly in a 1000 ml polyethylene beaker. The mixture was then immediately poured into mold fabricated from a 1000 ml cylindrical polyethylene beaker. The filled mold was pressurized as in Example 1 and incubated at 25° C. for 20 hours. The solid dosimeter was then removed from the mold.

Example 9

Crystal Clear 206 Part A (135 g), Crystal Clear 206 Part B (112 g), chloroform (80 g), leucomalachite green (10 g), and Optic Part 14X catalyst (0.5 ml) were blended thoroughly in a 500 ml polyethylene beaker. The mixture was then immediately poured into mold fabricated from a 500 ml cylindrical polyethylene beaker. The filled mold was pressurized as in Example 1 and incubated at 25° C. for 20 hours. The solid dosimeter was then removed from the mold.

Example 10

Crystal Clear 206 Part A (135 g), Crystal Clear 206 Part B (112 g), chloroform (80 g), crystal violet lactone (10 g), and Optic Part 14X catalyst (0.5 ml) were blended thoroughly in a 500 ml polyethylene beaker. The mixture was then immediately poured into mold fabricated from a 500 ml cylindrical polyethylene beaker. The filled mold was pressurized as in Example 1 and incubated at 25° C. for 20 hours. The solid dosimeter was then removed from the mold.

Example 11

Tinuvin (2.8 g) was dissolved in carbon tetrachloride (340.9 g) and HMDI (500.0 g) was added. This solution was blended thoroughly with Tone 32B8 (1624.1 g), leucomalachite green (32.4 g) and Optic Part 14X catalyst (1.0 ml). The mixture was then immediately poured into mold fabricated from an 800 ml cylindrical polyethylene beaker. The filled mold was pressurized as in Example 1 and incubated at 25° C. for 4 hours. The solid dosimeter was then removed from the mold.

Example 12

Z-8002 Part B Isocyanate (200 g), Cytec Polyol (200 g), carbon tetrachloride (90 g), and leucomalachite green (9 g) were blended thoroughly. The mixture was then immediately poured into mold fabricated from an 800 ml cylindrical polyethylene beaker. The filled mold was pressurized as in Example 1 and incubated at 25° C. for 4 hours. The solid dosimeter was then removed from the mold.

Example 13

Tolonate XIDT-70B (70% solution in butyl acetate, 250 g), Crystal Clear 206 Part B (100 g), carbon tetrachloride (94 g), leucomalachite green (9.4 g) and Optic Part 14X catalyst (0.4 ml) were blended thoroughly in a 1000 ml polyethylene beaker. The mixture was then immediately poured into mold fabricated from a 1000 ml cylindrical polyethylene beaker. The filled mold was pressurized as in Example 1 and incubated at 25° C. for 1.5 hours. The molded dosimeter was then warmed at 50° C. for 18 hours. The solid dosimeter was then removed from the mold.

Example 14

Poly-Optic 14–70 Part A (100 g), Poly-Optic 14–70 Part B (125 g), carbon tetrachloride (39.8 g), and leucomalachite green (10.0 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 15

Poly-Optic 14–70 Part A (102.7 g), Poly-Optic 14–70 Part B (123.2 g), bromochloromethane (19.3 g), and leucomalachite green (10.0 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 16

Poly-Optic 14–70 Part A (103.4 g), Poly-Optic 14–70 Part B (126.6 g), tribromopropane (55.2 g), and leucomalachite green (10.0 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 17

Poly-Optic 14–70 Part A (104.8 g), Poly-Optic 14–70 Part B (126.0 g), 1,6-dibromohexane (47.6 g), and leucomalachite green (10.0 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 18

Poly-Optic 14–70 Part A (107.5 g), Poly-Optic 14–70 Part B (129.6 g), bromochloromethane (77.2 g), carbon tetrachloride (3.2 g) and benzoylmethylene blue (5.03 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 19

Poly-Optic 14–70 Part A (45 g), Poly-Optic 14–70 Part B (45 g), tetrahydrofuran (5.0 ml), benzoyl peroxide (1.0 ml), and leucomalachite green (4.0 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 20

Poly-Optic 14–70 Part A (80 g), Poly-Optic 14–70 Part B (100 g), tetrahydrofuran (7.0 ml), a solution of azobis (isobutyrylnitrile) (0.29 g) in tetrahydrofuran (0.2 ml), and leucomalachite green (4.0 g) were blended thoroughly. The mixture was then immediately poured into mold fabricated from a 400 ml cylindrical polyethylene beaker. The filled mold was pressurized as in Example 1 and incubated at 25° C. for 24 hours. The solid dosimeter was then removed from the mold.

Example 21

Crystal Clear 206 Part A (100 g), Crystal Clear 206 Part B (100 g), tetrachloroethane (47.9 g), Pergascript Blue I-2R (3 g), were blended thoroughly in a 500 ml polyethylene beaker. The mixture was then immediately poured into mold fabricated from a 500 ml cylindrical polyethylene beaker. The filled mold was pressurized as in Example 1 and incubated at 25° C. for 72 hours. The solid dosimeter was then removed from the mold.

Example 22

Crystal Clear 206 Part A (150 g), Crystal Clear 206 Part B (150 g), tetrachloroethane (112 g), Pergascript Blue SRB-P (10 g), were blended thoroughly in a 500 ml polyethylene beaker. The mixture was then immediately poured into mold fabricated from a 500 ml cylindrical polyethylene beaker. The filled mold was pressurized as in Example 1 and incubated at 25° C. for 72 hours. The molded dosimeters were then warmed at 50° C. for 6 hours. The solid dosimeter was then removed from the mold.

Example 23

ConOptic 2020 Part A (100 g), ConOptic 2020 Part B (100 g), tetrachloroethane (45 g), and leucomalachite green (3.9 g) were blended thoroughly in a 500 ml polyethylene beaker. The mixture was then immediately poured into 30 ml glass vials. The filled molds were pressurized as in Example 1 and incubated at 25° C. for 72 hours. The dosimeters were irradiated as in Example 2 at 4.4 Gy/min, resulting in the development of a clearly visible dosimetric map. The dosimeters were then warmed in an oven at 50° C. for 20 minutes. During this time the exposed areas of the dosimeters were completely bleached and the dosimetric data was erased. The irradiation-bleaching process was repeated twice more on the same set of dosimeters. Each time the irradiation resulted in a clearly visible dosimetric map, and the bleaching completely erased the data.

Example 24

Crystal Clear 206 Part A (260 g), Crystal Clear 206 Part B (200 g), tetrachloroethane (104 g), leucomalachite green (10 g), Optic Part 14X catalyst (0.2 ml), and Hisorb 944 were blended thoroughly in a 1000 ml polyethylene beaker. The mixture was then immediately poured into mold fabricated from a 1000 ml cylindrical polyethylene beaker. The filled mold was pressurized as in Example 1 and incubated at 25° C. for 20 hours. The solid dosimeter was then removed from the mold.

Example 25

Crystal Clear 206 Part A (1048 g), Crystal Clear 206 Part B (800 g), tetrachloroethane (480 g), leucomalachite green (40 g), Optic Part 14X catalyst (1.0 ml), and Hisorb 328 (2 g) were blended thoroughly in a 2000 ml polyethylene beaker. The mixture was then immediately poured into a polyethylene mold having the size and shape of the average human brain. The filled mold was pressurized as in Example 1 and incubated at 25° C. for 36 hours. The molded dosimeter was warmed to 40° C. for 48 hours. The solid dosimeter was then removed from the mold.

Example 26

HMDI (280 g), Crystal Clear 206 Part B (242 g), methylene chloride (162 g), Pergascript Blue SRB-P (16 g), Optic Part 14X catalyst (0.5 ml), were blended thoroughly in a 1000 ml polyethylene beaker. The mixture was filtered through a 10 µm filter and pressurized as in Example 1 and incubated at 25° C. for 20 hours.

Example 27

HMDI (66 g), Crystal Clear 206 Part B (58 g), chloroform (10 g), carbon tetrachloride (27 g), leuco crystal violet (3.8 g), Optic Part 14X catalyst (0.2 ml), were blended thoroughly in a 100 ml polyethylene beaker. The mixture was filtered through a 10 µm filter and pressurized as in Example 1 and incubated at 25° C. for 20 hours.

What is claimed is:

1. A method for detecting radiation comprising the steps of;
    a) subjecting a shaped solid dosimeter to a radiation field, said dosimeter comprises a transparent or translucent polymer and one or more reporter compounds dispersed within said dosimeter,
    b) analyzing three dimensional data from said dosimeter exposed to said radiation field by evaluating optical properties of said dosimeters using a tomographic process
    c) illuminating said dosimeter with a light source;
    d) detecting light from said dosimeter;
    e) processing said detected light to construct a three dimensional image; and
    rotating said dosimeter and repeating steps c, d, and e.
2. The method of claim 1 further comprising the step of:
    c. calculating an amount and distribution of radiation received by the dosimeter from said analyzed three dimensional data.

3. The method of claim 1 wherein an absolute dose is calculated in said step c.

4. A method for detecting radiation comprising the steps of;
   a. subjecting a shaped solid dosimeter to a radiation field, said dosimeter comprises a transparent or translucent polymer and one or more reporter compounds dispersed within said dosimeter, and
   b. analyzing three dimensional data from said dosimeter exposed to said radiation field by evaluating optical properties of said dosimeters using a tomographic process wherein the radiation emits from a radionuclide.

5. The method of claim 4 wherein the radionuclide is selected from the group consisting of radioactive isotopes of iodine, strontium, samarium, yttrium, ruthenium, palladium, cobalt and iridium.

6. A system for detecting radiation comprising:
   means for subjecting a shaped solid dosimeter to a radiation field, said dosimeter comprises a transparent or translucent polymer and one or more reporter compounds dispersed within said dosimeter;
   means for analyzing three dimensional data from said dosimeter exposed to said radiation field by evaluating optical properties of said dosimeter; and
   means for rotating said dosimeter.

7. A system for detecting radiation comprising:
   means for subjecting a shaped solid dosimeter to a radiation field, said dosimeter comprises a transparent or translucent polymer and one or more reporter compounds dispersed within said dosimeter;
   means for analyzing three dimensional data from said dosimeter exposed to said radiation field by evaluating optical properties of said dosimeter wherein the radiation emits from a radionuclide.

8. The system of claim 7 wherein the radionuclide is selected from the group consisting of radioactive isotopes of iodine, strontium, samarium, yttrium, ruthenium, palladium, cobalt, and iridium.

* * * * *